J. T. PLUMER.
SPRAYER.
APPLICATION FILED DEC. 30, 1919.
1,390,310.
Patented Sept. 13, 1921.
3 SHEETS—SHEET 1.
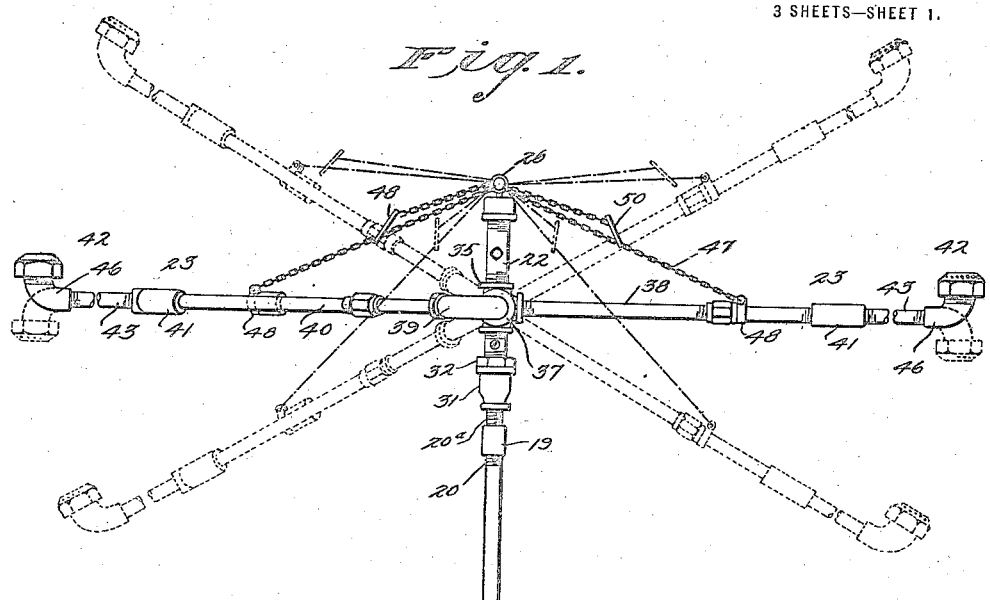
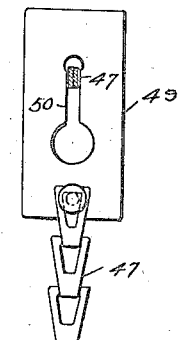
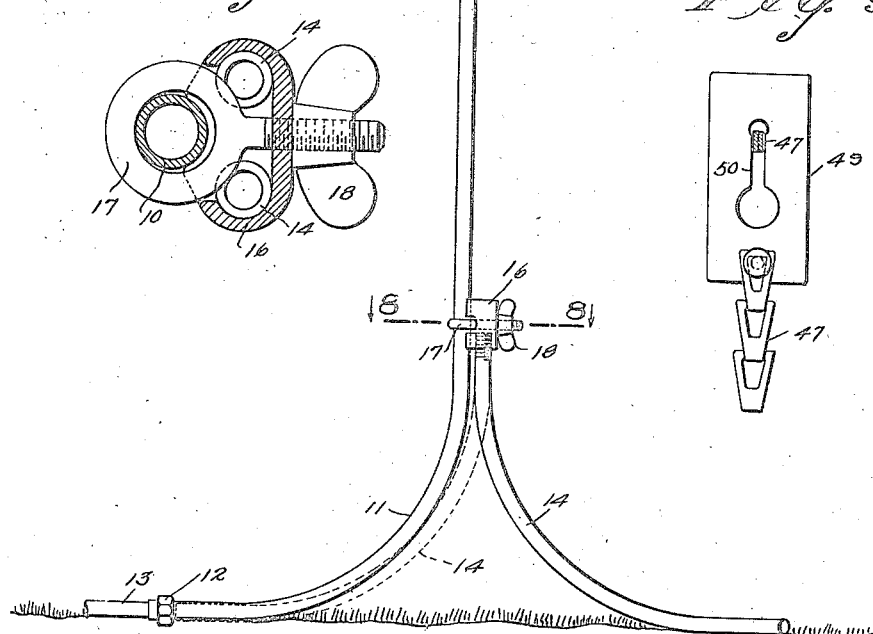
WITNESSES
INVENTOR
JAMES T. PLUMER.
BY
ATTORNEYS

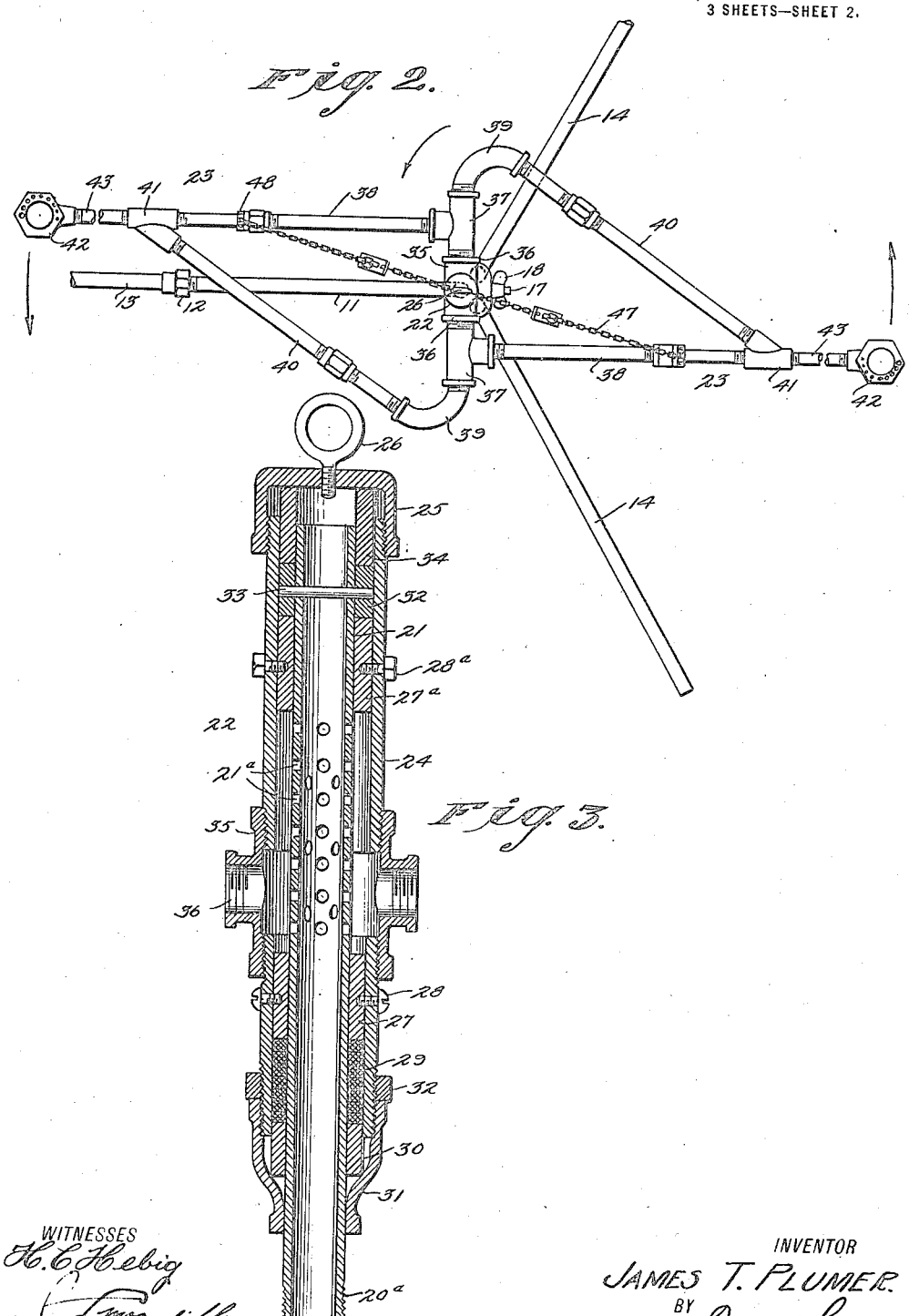

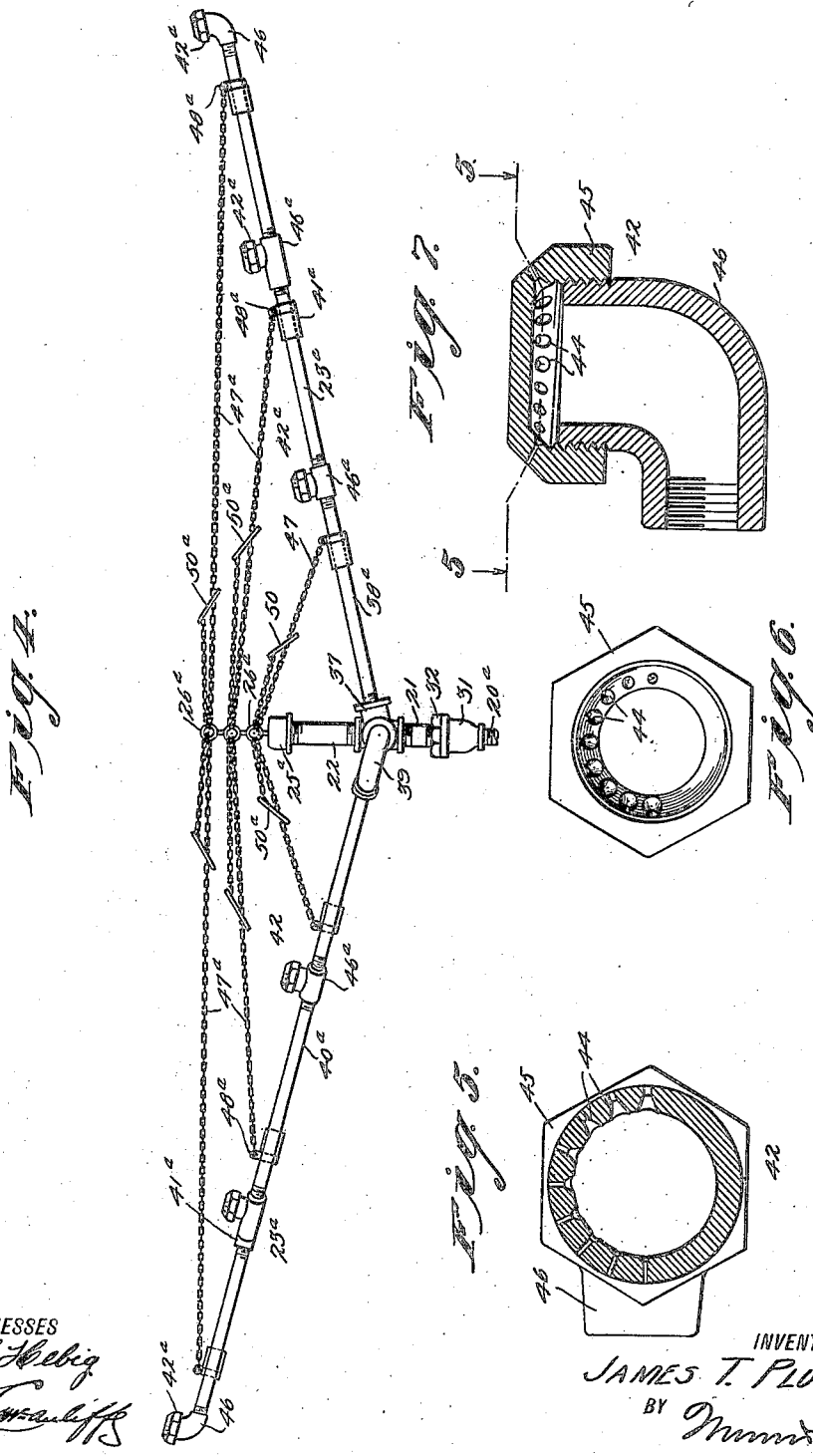

UNITED STATES PATENT OFFICE.

JAMES T. PLUMER, OF DETROIT, MICHIGAN.

SPRAYER.

1,390,310.  Specification of Letters Patent.  Patented Sept. 13, 1921.

Application filed December 30, 1919. Serial No. 348,304.

*To all whom it may concern:*

Be it known that I, JAMES T. PLUMER, a citizen of the United States, and a resident of North End Station, Detroit, in the county of Wayne, and State of Michigan, have invented a new and Improved Sprayer, of which the following is a description.

My invention relates to an apparatus for spraying lawns, gardens, or the like, and more particularly relates to a sprayer of the indicated type employing laterally extending sprayer arms mounted to revolve about a vertical or approximately vertical axis and arranged to spray a comparatively large area.

The general object of the invention is to provide a spraying apparatus of the indicated character improved in various particulars with a view to effect a proper distribution of the spray in the gradually increasing zones covered by the sprayer arms and their appurtenances.

A further object of the invention is to provide a novel construction of sprayer arms so arranged as to be effectively revolved by the reaction of the water pressure as well as a distributing head for conducting water to the sprayer arms; and to provide for adjusting the sprayer arms vertically, whereby to dispose sprayer elements thereof either horizontally or at an angle more or less above or below the horizontal for varying the sprayed area and the spraying of individual zones in the area.

The invention also has for its object to provide for disposing the elements of the structure in compact form as for shipping or storing and without disturbing the water connections.

The above and other objects as will appear are attained by a sprayer having the novel features and combination of parts hereinafter particularly described and claimed.

Reference is to be had to the accompanying drawings forming a part of this specification, it being understood that the drawings are merely illustrative of one example of the invention.

Figure 1 is a side elevation of a sprayer embodying my invention;

Fig. 2 is a plan view thereof;

Fig. 3 is an enlarged vertical section of a distributing head;

Fig. 4 is a side elevation of the upper portion of the sprayer in a modified form, employing comparatively long sprayer arms;

Fig. 5 is a horizontal section through one of the individual sprayer heads, the section being taken on the line 5—5, Fig. 7;

Fig. 6 is an inverted plan view of the cap of said sprayer head;

Fig. 7 is a vertical section of the sprayer head on the outer end of a sprayer arm;

Fig. 8 is an enlarged horizontal section on the line 8—8, Fig. 1;

Fig. 9 is a plan view of one of the cleats employed in adjusting the suspension chains of the sprayer arms.

In carrying out my invention in accordance with the illustrated example, a tubular standard 10 is provided of any desired height, according to the capacity of the particular sprayer as to the area to be sprayed, and advantageously said standard at the lower end curves outwardly in the form of an integral leg 11 which is adapted to be connected with a source of water supply, there being indicated a coupling 12 for connecting a supply pipe or hose 13. Additional separate legs 14 are employed, there being two of these in the illustrated form. Said legs 14 are curved to afford with the leg 11 a substantial base support for the sprayer. Preferably, said legs 14 are threaded at their upper ends into a clamp 16 having an eye bolt 17 embracing the standard 10, the shank of the bolt passing through said clamp 16 and receiving a suitable nut 18, the arrangement being such that said legs 14 may be turned in the clamp 16 to swing the legs adjacent to the rigid leg 11 so that the legs occupy a small space. The elements, 16, 17, 18, serve to firmly hold the legs 11 either in the folded or supporting positions.

The upper end of the standard 10 connects with the spraying means for which purpose in the illustrated form said upper end is threaded as at 20 to be engaged by a turnbuckle 19, the upper end of which engages reversed threads 20$^a$ on the lower end of an inner pipe 21 of a distributing head designated generally by the numeral 22 for supplying water to the sprayer arms designated generally by the numeral 23.

The distributing head 22 includes with the inner tube 21 an outer shell 24 spaced from said tube and adapted to revolve thereon, said shell being closed at the top by a cap 25 having an eye 26 and having communication with the sprayer arms 23 as will appear. The inner tube 21 has a multiplicity of perforations 21ᵃ adjacent to the discharge outlets 36, the perforations having a total capacity sufficient to maintain a supply of water in the shell 24 and the sprayer arms 23. Any suitable means may be provided for spacing the shell 24 and revolubly supporting it on the tube 21, there being shown for the purpose as one example, a lower sleeve 27 within said shell and snugly embracing the tube 21, said sleeve being fastened by screws 28. Packing material 29 is provided, surrounding the tube 21 beneath the sleeve 27 between the latter and the collar 30 so that a stuffing box is formed preventing leakage about the interior of tube 21. The lower end of shell 24 is closed by a cap 31 through which the tube 21 snugly extends, said cap being threaded onto the lower end of said shell and held in adjusted position by a nut or threaded ring 32. An upper spacing sleeve 27ᵃ surrounds the tube 21 within sleeve 24 and is held to said shell by screws 28ᵃ or the like. A fixed collar 32 is provided on the tube 21 above the sleeve 27ᵃ and is made fast by any suitable means such as a transverse pin 33. A sleeve 34 is shown in the present construction above and resting on the fixed collar 32 between the same and the cap 25.

The shell 24 is provided with discharge outlets corresponding in number with the sprayer arms 23 of which there are two in the present example and therefore two diametrically opposite outlets 36 in a coupling member 35 forming part of said shell. To each outlet 36 is secured one end of a T-coupling 37 to which the sprayer arms 23 are secured as follows: To the lateral outlet of each T-coupling 37 is secured a straight pipe 38 each forming part of an arm 23 and to that end of the T-coupling 37 opposite the adjacent outlet 36 is an elbow coupling 39, through which an oblique pipe 40 is secured, the outer end of said oblique pipe being suitably connected by a Y-coupling 41 with the adjacent straight pipe 38. Thus, the pipes 38, 40 of a distributing arm 23 communicate with the distributing head 22 through the medium of the respective T-coupling 37. Although the reaction of the water pressure flowing into the pipes 38, 40 of each sprayer arm 23 acts in opposite directions since said pipes are at opposite sides of the axis of rotation of the shell 24, nevertheless said reaction will tend to turn the shell 24 and revolve the arms 23 because the connection at 39 with the pipe 40 is at a greater distance from the center of revolution than the pipe 38 of the same arm 23 and therefore the pressure acts through an arm having a greater effective leverage in the case of the pipe 40 than in the case of the pipe 38. Each sprayer arm 23, (Figs. 1 and 2) or 23ᵃ (in Fig. 4) is provided with means presenting sprayer jets as next described.

The form shown in Figs. 1 and 2 is designed for comparatively short sprayer arms employing a single sprayer head 42 at the outer end of the arm and suffices for spraying an area having a given radius from the axis of rotation of the square. The single sprayer head 42 is shown as carried on the outer ends of a short length of pipe 43, the inner end of which is secured to the adjacent Y-coupling 41. Each sprayer head, as clearly seen in Figs. 5 to 7, is formed with an arcuate series of jet orifices 44 disposed radially to the center of the head, the series extending for half the circumference of the head or approximately so and being located at the rear or trailing side of the sprayer head to be not opposed by the air pressure as the sprayer arm revolves. The said orifice is formed in a cap 45 threaded onto an elbow 46 forming with said cap the sprayer head, said elbow having a threaded connection with the arm 43 at the outer end of the latter. As clearly seen in Fig. 5 the jet orifices 44 are of increasing capacity from one end of the series to the other, the largest of the orifices being disposed at that portion of the sprayer head 42 farthest from the axis of rotation so as to throw jets beyond the actual sweep of the sprayer arm and from the outermost and largest one of the jet orifices, the latter are disposed at decreasing angles to the general axis of the sprayer arm to throw jets laterally, the smallest of the orifices being so disposed as to throw a jet radially inward, or approximately radially inward. Thus, the smallest one of the jet orifices will suffice to throw a spray in proximity to the standard 11, each successive orifice, of increasing size and at an increased angle to a general radial line, serving to throw its jet an increased distance. Furthermore, it will be observed from Figs. 5 to 7 that each jet orifice flares toward its inner end and that the outer portion of the jet orifice is cylindrical, this being provided as an aid to determine the relative capacity of the orifices. Thus, the length of the cylindrical portion increases with the degrees in the diameter of the respective orifice. The flaring inner end maintains a constant supply of water to each jet orifice, while for regulating the capacity, the length of the cylindrical portion and the diameter thereof is availed of. The elbows 46 of the sprayer heads 42 may be turned to invert the latter so that caps 45 are at the under side thereof instead of at the top as the attendant may desire.

In the form shown in Fig. 4 the construction provides for longer sprayer arms 23ᵃ and these are each provided with a plurality of sprayer heads 42ᵃ at intervals along said arms, there being three shown, one of which is at the outer end and includes the described elbow 46 while the others include T-couplings 46ᵃ interposed between the pipe sections of which said arms 23ᵃ are made up in practice.

The arms 23, or 23ª, may be rocked vertically to dispose the same horizontally as in full lines in Fig. 1 or at an angle above or below the horizontal as in dotted lines in said figure. Referring to Fig. 2, it will be seen that if the arm 23 at the right is swung downwardly or upwardly its arm 40 with the elbow 39 may turn in the outer end of the adjacent T-coupling 37. At the same time said adjacent T-coupling 37 may turn in the adjacent end of the coupling 35 for permitting the swinging of the pipe 38 of the arm 23 at the left of Fig. 2 and the same is true of the pipe 40 at the left and the pipe 38 at the right of the figure. The angular adjustment of the sprayer arms provides for attaining a uniform spraying of a given area by shortening the trajectory of the sprays discharged from the larger jet orifices 44 and correspondingly lengthening those jet orifices disposed more or less toward the axis of rotation of the sprayer arms.

I provide stay means for the sprayer arms adjustable to suit the angular positions of said arms and for the purpose use is made of stay chains 47, Figs. 1 and 2, said chains passing through the eye 26, and each returned on itself. One end of each chain is made fast to a collar or other suitable device 48 on an arm 23 and the other end is connected with a cleat 49 having a slot 50 of keyhole shape or other suitable shape through which that stretch of the chain passes that runs from the fastened end at 48 to the ring 26, the cleat serving to tighten the chain after the manner in which tent ropes and other guy ropes are tautened. In the form shown in Fig. 4 having comparatively long arms (23ª) several guy chains 47ª are employed, each fastened at one end as at 48ª to the sprayer arm, at different points thereon, said chains running through a plurality of eyes 26ª on a cap 25ª to cleat 50ª, the same as in the first instance. It is to be understood that the arms 23ª except for their length are the same as the arms 23 as to having members 38ª, 39ª, 40ª, 41ª and 43ª which correspond with the elements 38, 39, 40, 41 and 43. Arms 23, 23ª may fold downwardly adjacent to standard 10 for compactness.

Referring again to the inverting of the head 42 I would here state that when the heads are inverted, the cap 45 may be given a half turn to dispose the jet orifices 44 at the rear or trailing side of the head. Moreover, the arcuate series of jet orifices in the head 42 materially contributes to the revolving of the sprinkler since it will be seen that while both the end orifices of the series are on an approximately radial line and therefore neutral as to lateral pressure, the intermediate orifices contribute in proportion to their distances from the ends of the series, a lateral reacting force tending to rotate the sprinkler about the axis of the standard. Furthermore, the construction and arrangement of the head permits of the same being adjusted to vary the trajectory according to the water pressure. With the axis of the head upright and the jets therefore issuing on lines at a slight angle to a horizontal plane, the trajectory under a given pressure will be through a greater distance than if the head be given a slight turn on the connection 43 about the axis of the latter, so that the jet orifices incline upwardly at a greater angle to a horizontal plane. Therefore, the jets may be made to sprinkle approximately the same area with varying pressures by turning the head to vary the angle at which the jets are discharged.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention I claim:

1. In a sprayer, a revolubly mounted laterally disposed sprayer element, a sprayer head on said element remote from the axis of revolution thereof, and a separate cap on said head presenting at one side thereof a series of jet orifices at varying angles to the longitudinal axis of said element; said head being turnable on said element to permit of the cap being inverted, and said cap being turnable on the head to dispose said orifices at the trailing side of the head whether the head be inverted or not.

2. In a sprayer, a laterally disposed revolubly mounted sprayer element, and sprayer means thereon remote from the axis of revolution of said element and presenting a series of jet orifices laterally disposed at different angles relatively to the longitudinal axis of said element to discharge laterally at various distances from and at varying angles to a line drawn radially to said axis, those orifices nearest to the axis of rotation of said element being the smallest, the size of the orifices increasing with their distance from the axis of rotation.

3. In a sprayer, a laterally disposed revolubly mounted sprayer element, and sprayer means thereon remote from the axis of revolution of said element and presenting a plurality of jet orifices at different angles, to the longitudinal axis of said element, said orifices presenting a flared inner end and a cylindrical outer portion, the lengths of the cylindrical portions of the respective orifices decreasing with the distance of the orifice from the axis of rotation of said element.

4. A sprayer including a revolubly mounted approximately vertical distributing means adapted to be connected with a source of water supply and including a revolubly mounted discharge element, oppositely disposed sprayer arms, and couplings at opposite sides of said discharge element at an angle to the axis of said arms and in communication with said element, each arm having a connection with both of said couplings and provided with sprayer means.

5. In a sprayer, approximately vertical distributing means adapted to be connected with a source of water supply and including a revolubly mounted discharge element, and a lateral arm on said discharge element provided with sprayer means, said arm presenting elements disposed at their inner ends at opposite sides of said discharge element and at unequal distances from the axis of revolution of the discharge element, both of said arm elements being in communication with said discharge element and with the sprayer means.

6. In a sprayer, approximately vertical distributing means adapted to be connected with a source of water supply and including a revolubly mounted discharge element, oppositely disposed lateral sprayer arms having sprayer means, each arm presenting two tubular elements, one tubular element of each arm being connected with said discharge element at one side thereof and the other tubular element of each arm being connected with the discharge element at the opposite side of the latter, said tubular elements being disposed at their inner ends unequal distances from the axis of revolution of the discharge element.

7. In a sprayer, approximately vertical water conducting means adapted to be connected with a source of water supply and including a revolubly mounted discharge element, and a lateral arm on said discharge element and provided with sprayer means, said arm presenting elements disposed at their inner ends at opposite sides of said discharge element and rockably supported to vary the angular positions of said arm.

8. In a sprayer, approximately vertical water conducting means adapted to be connected with a source of water supply and including a revolubly mounted discharge element, T-couplings on said discharge element at opposite sides thereof and each connected at one end therewith, and oppositely disposed lateral arms in planes at angles to the T-couplings and provided with sprayer means, each of said arms presenting an element connected with one T-coupling at the end of the latter opposite the connection with the discharge element, and presenting another element connected with the other T-coupling at the lateral member thereof, one of said arm elements being in communication with said discharge element, and with the sprayer means of said arm.

9. In a sprayer, approximately vertical water conducting means adapted to be connected with a source of water supply, and including a revolubly mounted discharge element, T-couplings on said discharge element at opposite sides thereof and each turnably connected at one end with said discharge element, and oppositely disposed arms in planes at angles to the T-couplings, each of said arms presenting a member turnably connected with one T-coupling at the end opposite to the discharge element and presenting a member connected with the other T-coupling at the lateral member thereof, at least one of said members of each arm being in communication with said discharge element and with the sprayer means of said arms.

10. In a sprayer, approximately vertical water conducting means adapted to be connected with a source of water supply and including a revolubly mounted discharge element, and a lateral arm on said discharge element and provided with sprayer means, said arm presenting elements disposed at their inner ends at opposite sides of said discharge element and rockably supported to vary the angular positions of said arm; together with an adjustable stay connected with said arm and engaging said discharge element above the arm.

JAMES T. PLUMER.